(12) United States Patent
Crean et al.

(10) Patent No.: US 9,407,776 B2
(45) Date of Patent: Aug. 2, 2016

(54) METHOD FOR EVALUATION OF PRINTING AND IMAGING SYSTEMS THAT GRADE ATTRIBUTES OF AN IMAGE EVALUATION DOCUMENT PRODUCED BY SUCH SYSTEMS

(71) Applicant: Technology Watch, LLC, Springfield, VA (US)

(72) Inventors: Peter Aidan Crean, Webster, NY (US); Peter Harrold Dundas, Pittsford, NY (US); Henry Bernard Freedman, Burke, VA (US)

(73) Assignee: TECHNOLOGY WATCH, LLC, Springfield, VA (US)

(*) Notice: Subject to any disclaimer, the term of this patent is extended or adjusted under 35 U.S.C. 154(b) by 35 days.

(21) Appl. No.: 14/458,623

(22) Filed: Aug. 13, 2014

(65) Prior Publication Data
US 2015/0049921 A1    Feb. 19, 2015

Related U.S. Application Data

(60) Provisional application No. 61/865,363, filed on Aug. 13, 2013.

(51) Int. Cl.
| | |
|---|---|
| *G06K 9/00* | (2006.01) |
| *H04N 1/00* | (2006.01) |
| *G06T 7/00* | (2006.01) |
| *G06K 9/03* | (2006.01) |
| *G06K 9/46* | (2006.01) |

(52) U.S. Cl.
CPC ............ *H04N 1/00015* (2013.01); *G06K 9/036* (2013.01); *G06K 9/4652* (2013.01); *G06T 7/0004* (2013.01); *H04N 1/0005* (2013.01); *H04N 1/00005* (2013.01); *H04N 1/00034* (2013.01); *H04N 1/00047* (2013.01); *H04N 1/00068* (2013.01); *H04N 1/00079* (2013.01); *G06T 2207/30144* (2013.01)

(58) Field of Classification Search
None
See application file for complete search history.

(56) References Cited

U.S. PATENT DOCUMENTS

| | | | | |
|---|---|---|---|---|
| 7,903,282 | B2* | 3/2011 | Furukawa | H04N 1/40 358/1.13 |
| 2005/0057776 | A1* | 3/2005 | Furukawa | H04N 1/40 358/2.1 |
| 2005/0162681 | A1* | 7/2005 | Ng | G06K 15/02 358/1.14 |
| 2006/0251320 | A1* | 11/2006 | Diederichs | B41F 33/0036 382/165 |
| 2012/0321154 | A1* | 12/2012 | Korsten | A61B 8/0833 382/128 |
| 2013/0107313 | A1* | 5/2013 | Kirby | G06F 3/1203 358/1.15 |

* cited by examiner

*Primary Examiner* — Tahmina Ansari
(74) *Attorney, Agent, or Firm* — Panitch Schwarze Belisario & Nadel LLP

(57) ABSTRACT

A system and associated methods are provided for the evaluation of printing systems. Results may be expressed as a set of simple-to-understand alphabetic grades (e.g., A, B, C, D, F). These grades reflect the visual acceptability of prints of the image evaluation document produced by the printing system. Capabilities are provided for query and reporting of data across printing systems and over time for various attributes and factors.

19 Claims, 9 Drawing Sheets
(8 of 9 Drawing Sheet(s) Filed in Color)

FIG. 8

| | Overall Grade | | | | | |
|---|---|---|---|---|---|---|
| | 810 | 820 | 825 | 830 | 835 | 840 | 845 |
| Overall Grade | B | B- | -0.1 | B- | -0.4 | B- | -0.2 |
| Total Color | C | B- | 0.4 | C | -0.4 | B | 1.0 |
| Solids | B- | C | -0.6 | C | -0.4 | D | -1.4 |
| Lines & Text | A- | B | -0.7 | B | -0.3 | B | -0.3 |
| Facial Score | C | C | 0.0 | D | -1.0 | B | 1.0 |
| Neutral Score | B | B | 0.0 | A- | 0.5 | B | 0.0 |
| Memory Colors | C | A | 2.0 | C | 0.0 | A | 2.0 |
| Streaks & Bands | A | C | -2.0 | C | -2.0 | D | -3.0 |
| Mottle | C | C | 0.0 | B+ | 0.5 | C | -0.5 |
| Addressable Resolution | B | B | 0.0 | B- | 0.0 | B | 0.0 |
| Line Edge Noise | A | B | -1.0 | B- | -1.5 | B | -1.0 |
| Text Rendition | A | B | -0.9 | B | -0.7 | B | -1.1 |
| Line Width Reproduction | A | B | -1.0 | A- | -0.3 | A- | -0.3 |
| Color Registration | C- | C | 0.5 | B | 1.5 | A | 2.5 |
| Adjacency Defects | A | B- | -1.0 | A- | 0.0 | B | -0.5 |

© 2012 Technology Watch™, LLC

800 · 805 · 850 Category Averages · 860 · 870 Attribute Grades

METHOD FOR EVALUATION OF PRINTING AND IMAGING SYSTEMS THAT GRADE ATTRIBUTES OF AN IMAGE EVALUATION DOCUMENT PRODUCED BY SUCH SYSTEMS

CROSS-REFERENCE TO RELATED APPLICATIONS

This application claims the benefit of priority to U.S. Provisional Patent Application No. 61/865,363 filed Aug. 13, 2013.

NOTICE OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The quality of printing systems varies widely amongst different printing technologies, between instances of the same model of printing device, and even for a particular printing device, over time. While it is possible to measure certain parameters that relate to print quality, it has not been possible to produce straightforward, meaningful, and easy-to-understand results that correlate with user perception.

What is needed is a system for grading the imaging performance of printing systems that provides understandable results that correlate with user perception of quality.

BRIEF SUMMARY OF THE INVENTION

The present system and associated methods provide for assessment of print quality of one or more printing systems at one or more points in time. Results may be expressed as a set of simple-to-understand alphabetic grades (e.g., A, B, C, D, F). These grades reflect the visual acceptability of prints of the image evaluation document produced by the printing system.

The evaluation system uses a combination of technical and scientific measurements and visual evaluations. Resulting grades for a variety of measured attributes are combined and correlated with customer acceptance, factoring in the importance of each measurement. The system and associated methods may use measurements and metrics as part of attribute analysis, but apply "value-based weighting" in building grades. Category averages and overall averages are weighted by relative importance. The computation of averages preferably accounts for the overall perception of quality being disproportionately affected by the poorest attributes. For instance, while a printing system may perform well in terms of line reproduction, registration, general color accuracy and other metrics, a failure to accurately reproduce skin tones may lead to a low overall grade for the printing system due to the importance of that attribute to print consumers.

The system and associated methods provide the ability to compare different imaging devices such as printing presses against each other, compare a press against other presses of the same model, produce unbiased press assessments, determine that a press is operating normally, see how well a used press or older generation press can match a new press, test for quality on different paper stocks, test sales claims, such as the ability of one press to match the quality of another, test varying press setups to look for savings or quality loss, evaluate operator competence, and judge or qualify print providers in a competitive procurement.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

The patent or application file contains at least one drawing executed in color. Copies of this patent or patent application publication with color drawing(s) will be provided by the Office upon request and payment of the necessary fee.

In the drawings:

FIG. 1 is a diagram of an environment in which the evaluation system may operate;

FIG. 2 is a simplified system diagram of an evaluation system of FIG. 1;

FIG. 3 is an example of a portion of an image evaluation document used by the image evaluation system in assessing print uniformity for use in the evaluation system of FIG. 1;

FIG. 4 is an example of a portion of an image evaluation document directed to text and line evaluation for use in the evaluation system of FIG. 1;

FIG. 5 is an example of a portion of an image evaluation document directed to pictorial imagery for use in the evaluation system of FIG. 1;

FIG. 6 is another example of a portion of an image evaluation document direct to pictorial imagery of the evaluation system of FIG. 1;

FIG. 7 is an example of a portion of a printing device evaluation report of the evaluation system of FIG. 1;

FIG. 8 is an example of a portion of a printing device evaluation report of the evaluation system of FIG. 1; and FIG. 9 is an example of another portion of a printing device evaluation report of the evaluation system of FIG. 1.

DETAILED DESCRIPTION OF THE INVENTION

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Figure 1:
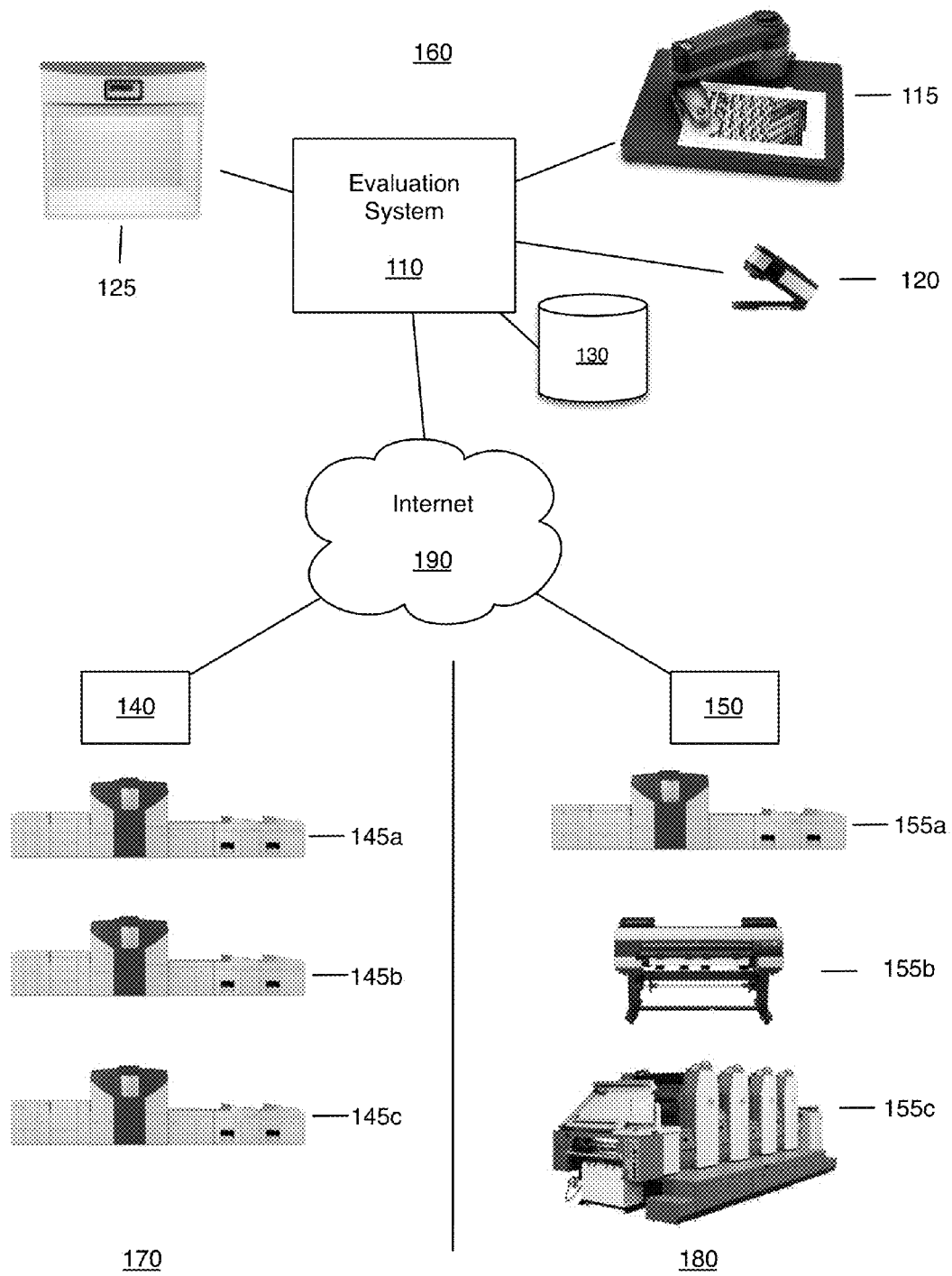

FIG. 1 is a diagram of an environment in which the evaluation system may operate. The evaluation system may reside at an evaluation facility 160 or at a printing location. The printing systems to be tested may reside at print facilities 170 and 180. Image test documents may be stored in storage 130.

Image test document data may be sent over various telecommunications systems such as the Internet 190, for example, or be delivered on physical media, to print facilities 170 and 180. Image test document data may be loaded onto a computer or server 140 or 150 at a print facility. The image evaluation document data may be manipulated by various prepress processes such as imposition or decomposition and rendering before being delivered, for example, to sheet-fed printing systems 145a, 145b, 145c, 155a, wide format printer or proofer 155b, or offset press 155c. After printing, the printed image evaluation documents may be delivered back to evaluation facility 160 for evaluation.

Upon return to evaluation facility 160, printed image evaluation documents are evaluated through a combination of electronic and visual processes. Visual inspection may preferably utilize a light booth 125 with the capability of producing one or more standard illumination spectra (e.g. D50 or D65). Measurement of printed color patches and other test targets may be performed with a handheld spectrophotometer 120, a spectrophotometer attached to an automated measurement stage 115, a colorimeter, a densitometer, a micro-densitometer, or other measurement devices, not shown.

Figure 2:
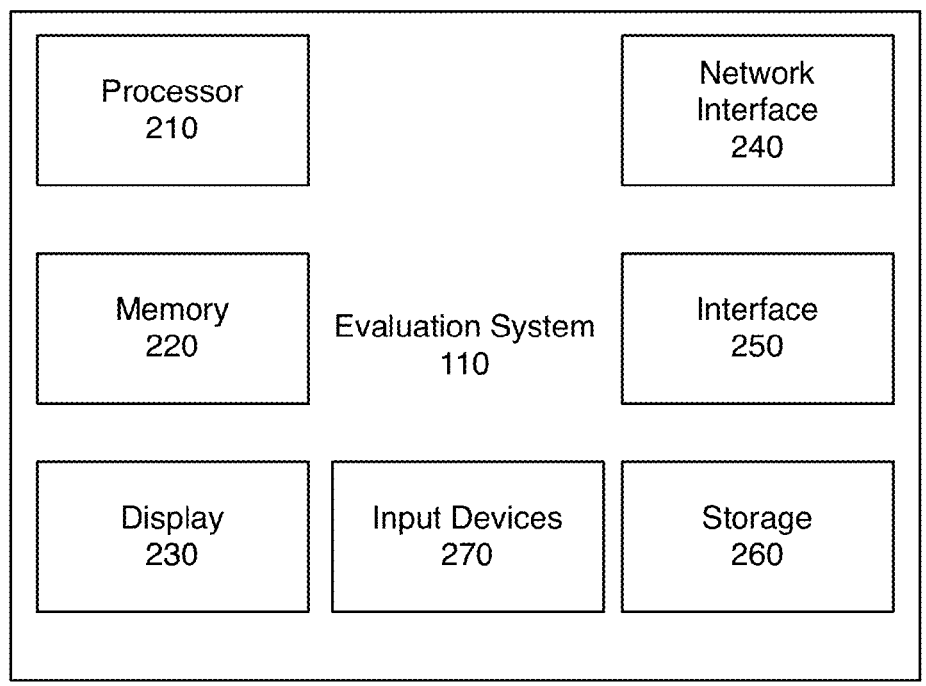

FIG. 2 is a simplified system diagram of an evaluation system. Evaluation system 110 may comprise a personal computer or customized hardware. Evaluation system 110 may comprise a processor 210 for executing program code for performing measuring and evaluation operations. Program code, image evaluation document data, customer data, printing device data, measurement data, and results may be stored in a memory 220 or in storage 260. One or more interfaces 250 may provide data communication with spectrophotometers 115 and 120 or other measurement and evaluation devices. Interface 250 may comprise a USB, Thunderbolt, serial port, or other interface. Network interface 240 may provide for communications with other systems via a local area network or the Internet 190. Network interface 240 may also be used to communicate directly with network-capable measurement and evaluation devices or with other computer systems attached to measurement and evaluation devices. Input devices 270 allow entry of customer information, visual evaluation information, and other data. Display 230 may be used to display data including evaluation results. It is to be understood that the functions of evaluation system 110 may be divided amongst multiple computing platforms. Evaluation system 110 may implement web server functionality to allow entry of measurement data from local or remote locations.

Aspects of the image evaluation documents produced and evaluated by the image evaluation system are shown in FIGS. 3-6 and described below. In a preferred embodiment of the evaluation system, different image evaluation documents are made available for each of a variety of types of printing systems. For instance, in a preferred embodiment, the image evaluation document for sheet and web-fed digital printing is a twenty page letter-sized PDF file. The image evaluation document for a wide-format press may comprise a ten-page letter-sized PDF file containing the test pages for measurement and assessment, but omitting pages for short-term stability testing. Still other image evaluation documents may comprise a single page, for instance, for offset presses or proofers. Such image evaluation documents may comprise, for instance, a 23×35 or 20×26 inch PDF page containing a reduced set of the content from pages for measurement and assessment.

It is to be understood that the following figures and descriptions are merely examples, and the actual form and content of the image evaluation documents may vary.

Figure 3:
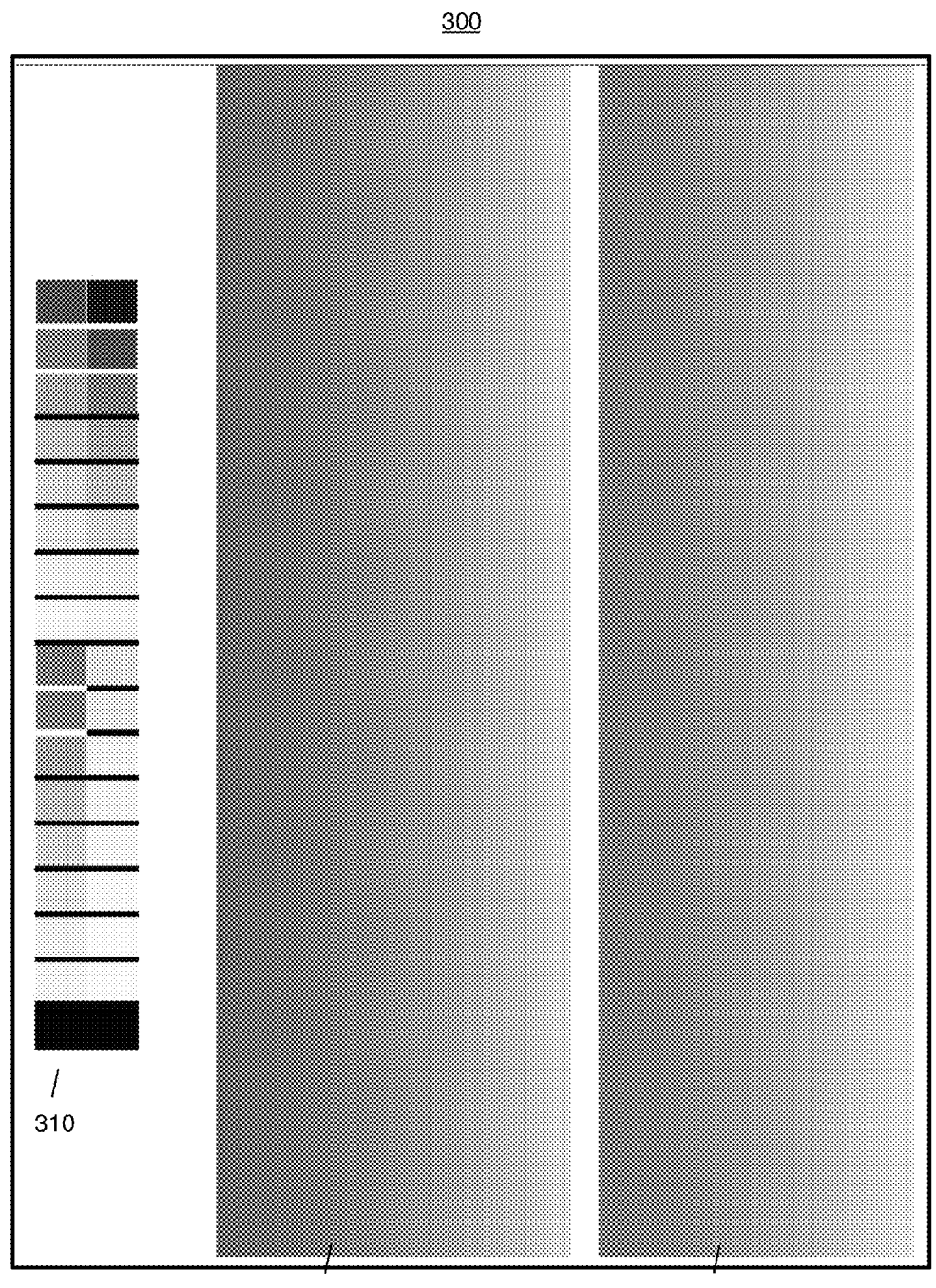

FIG. 3 is an example of a portion of an image evaluation document used by the image evaluation system in assessing print uniformity. In a preferred embodiment, the first ten pages of the evaluation document may be a uniformity test pattern preamble, such as that shown in FIG. 3, with five identical pairs of patterns to allow measurements to evaluate the short-term print stability of the press. Test pattern 300 may preferably comprise a set of color patches 310, a four-color neutral gradient portion 320, and a three-color neutral gradient portion 330. Other single-color gradients may also be used for uniformity evaluation. It is to be understood that while the repeated pages may be described as identical, they may differ in some identifying information, such as page numbering.

Figure 4:
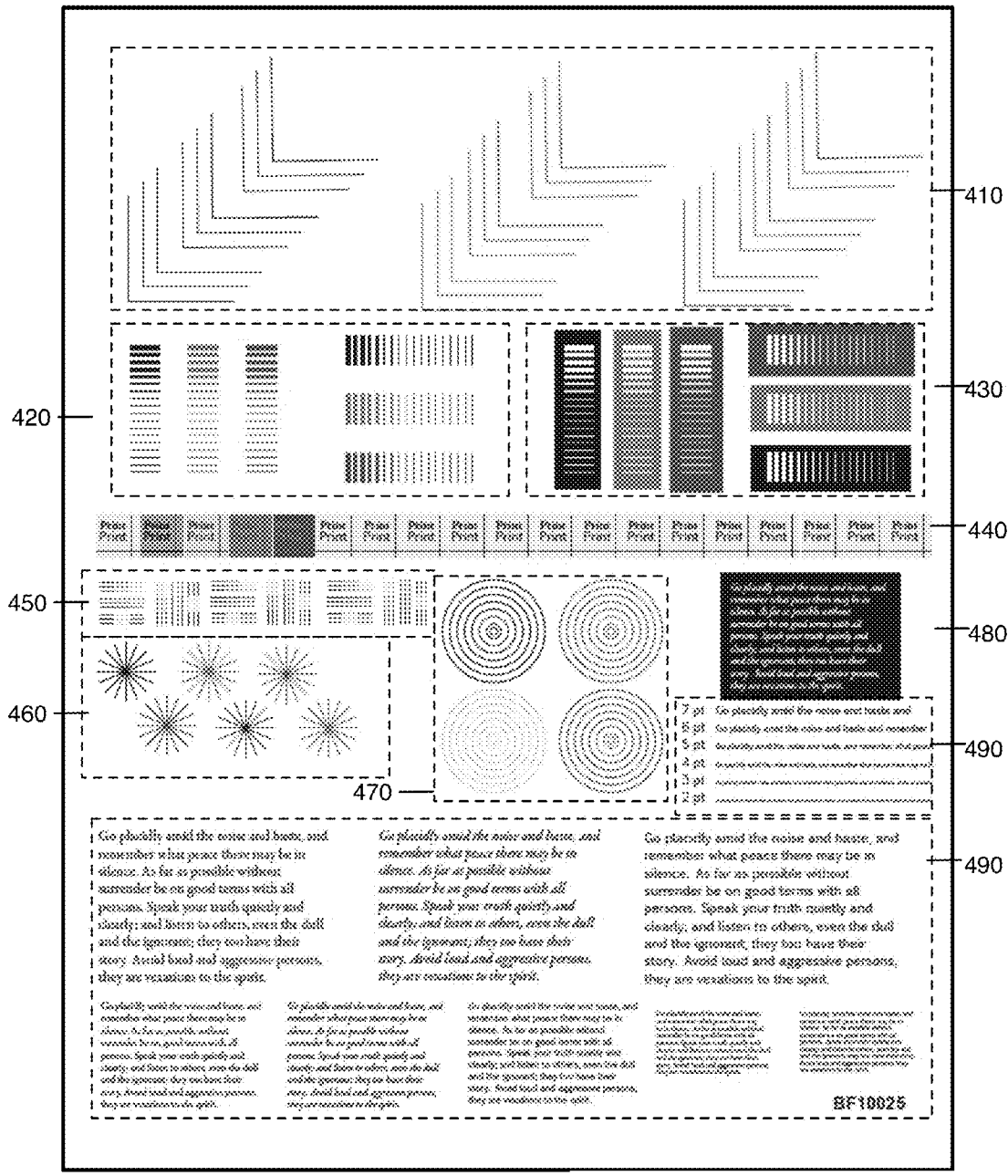
Figure 5:
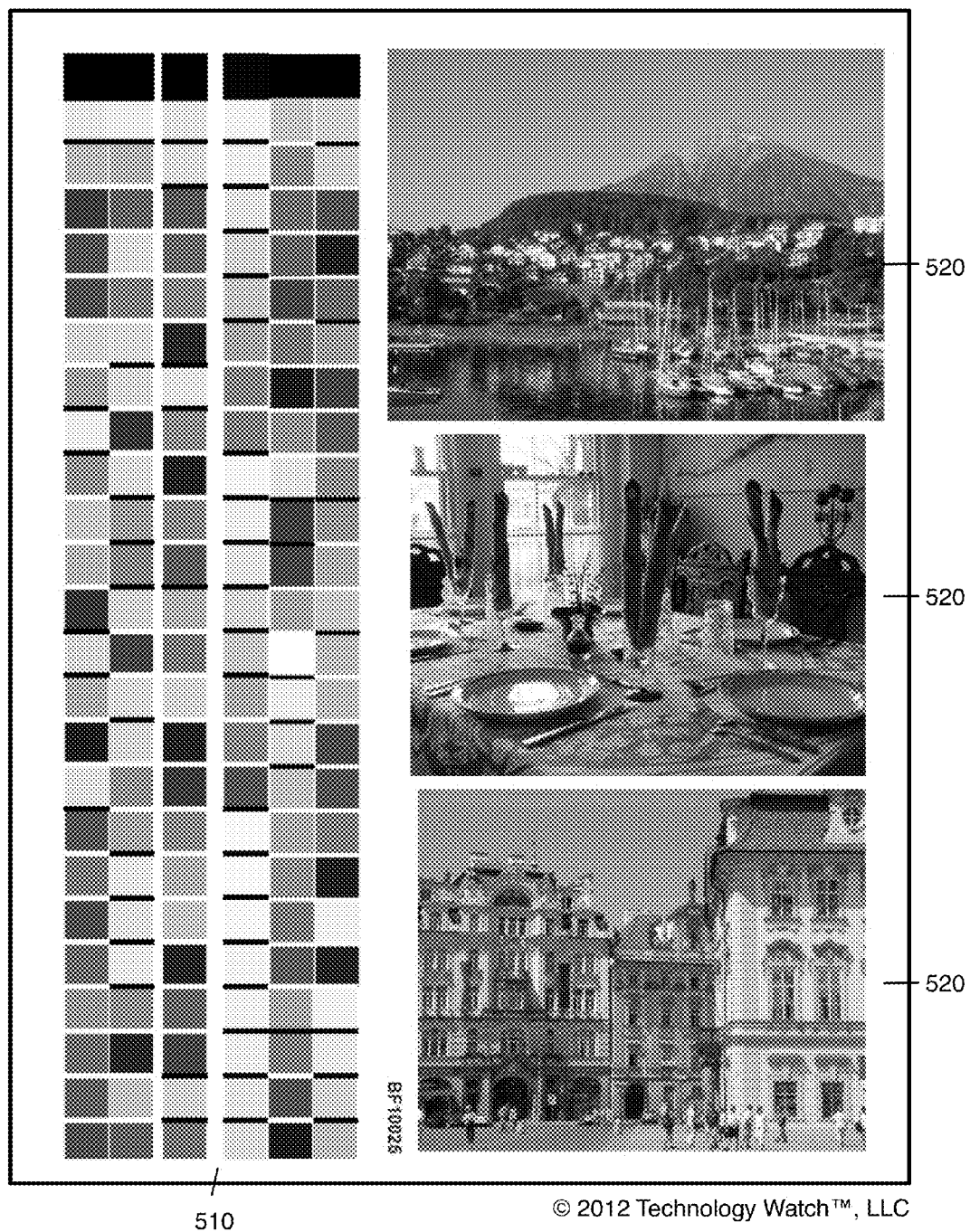
Figure 6:

Additional pages of the image evaluation document preferably comprise additional test patterns for measurement and assessment, such as those shown in FIG. 4, FIG. 5, and FIG. 6. These additional test patterns preferably are designed to assess various quality metrics related to reproduction of text, graphics, and pictorial content.

FIG. 4 is an example of a portion of an image evaluation document directed to text and line evaluation. Test pattern portion 400 preferably comprises a plurality of sub-portions directed at evaluation of a variety of image quality attributes. In this example, portion 410 comprises horizontal and vertical lines. Portion 420 comprises horizontal and vertical lines of varying thicknesses. Portion 430 comprises horizontal and vertical negative lines of varying thicknesses. Portion 440 comprises text on backgrounds of varying colors. Portion 450 comprises adjacent thin lines of various combinations of process colors for the evaluation of registration performance. Portion 460 comprises lines of varying angles in various process colors. Portion 470 comprises concentric circles rendered in various process colors. Portion 480 comprises negative fine text. Portions 490 comprise text at a variety of font sizes and rendered in a variety of fonts.

FIG. 5 is an example of a portion of an image evaluation document directed to pictorial imagery. Test pattern 500 preferably comprises a portion 510 comprising a variety of color patches of sufficient size for measurement and portions 520 comprising pictorial images sized for human evaluation.

FIG. 6 is another example of a portion of an image evaluation document direct to pictorial imagery. Test pattern 600 preferably comprises pictorial images such as images 610 and 620 comprising sky and foliage colors and images 630 and 640 comprising a variety of human skin tones, particularly images of human faces.

It is to be understood that these and any other images shown in the figure are merely representative and may be replaced by other images with content suitable for making the evaluations. It should also be recognized that the number of pages, the placement of elements on the pages, and spacing of the uniformity pages may be varied in accordance within the scope of the invention. Additionally, uniformity measurement patterns may be interspersed with other test patterns on some or all pages.

In a preferred embodiment, a customer is issued one uniquely identified PDF of the correct style for each grading. A unique identifier may preferably appear on each page of the image evaluation document and in the name of the electronic file.

At the completion of printing, the customer may trim the letter image pages and deliver them for evaluation. The customer may retain a second set of prints for later discussion and for inspection after the grades have been delivered.

Imposition and Trim

As described above, in a preferred embodiment, the image evaluation document for offset presses is a single imposed PDF page with internal cut marks. Imposition may be performed to format and orient the document for wide format, web and sheet-fed digital presses. Pages are preferably placed such that all pages have the same orientation.

If one page is placed across the process direction of the printing device, pages are preferably replicated across the process direction. The use of "N-across" imposition would lead to N copies of the PDF for each repeat of the document along the process direction. In this way, variations across the process may be isolated and measured.

The printer operator may add cut marks during the imposition to facilitate trimming to the 8.5×11 image size. Jobs are preferably trimmed to letter sized pages before delivery to the measurement facility.

Press Maintenance and Tuning

When performing printing system evaluation over time, it is preferable that the image document test set be printed when the press is in good operating condition. Documents are therefore preferably printed after start-up transients have settled out and when there are no outstanding maintenance issues, such as aged materials, repairable imaging problems, etc. Raster Image Processor (RIP) settings should also preferably be kept consistent across printings of the image evaluation document.

The evaluation system may be used for quality assurance for print products, or to assess the image quality impact of variables that can be controlled. To facilitate these assessments, users may record the RIP and press settings used in the test and also note any other variables that may affect print quality, such that they may be correlated during the evaluation with variations in the results.

RIP and Printer Settings

In a preferred embodiment, the image evaluation document PDF file uses three color-spaces: RGB, Pantone and CMYK. The RGB is preferably interpreted as sRGB, the Pantone colors should use in-RIP emulation, and the CMYK should be printed as native process colors, that is, the CMYK of the printer. The evaluation system may test the color accuracy of RGB rendering and Pantone simulation for using colors within the printer gamut. The printer gamut may be measured with test patterns defined in printer CMYK.

Many RIP and printer settings can affect image quality and therefore the evaluation grade. Use of the highest RIP resolution, anti-aliasing, and trapping may improve Text/Graphics grades. The halftone screen should be chosen for pictorial quality and resistance to noise, mottle and streaks to yield the highest Uniformity and Color grades.

Record Additional Print Conditions

Other information and any other variables that may affect print quality may be collected for analysis by the evaluation system, including:

Manufacturer, Model number, serial number of Press and DFE/RIP.
Geographic location of press being measured.
Time and day of test run.
Identity of press operator(s).
Copy of actual paper wrapper label that was on paper run for test.
Printout of the DFE/RIP settings.
Service history and provider.
Time of last calibration.
Determination if original manufacturer's or third-party consumables (e.g., toner) are used.

Prints of an image evaluation document are made on the printing system under test through the normal prepress and RIP settings and sent to a central site for measurement and grading. Grades are preferably generated for a dozen or so print attributes.

Attributes are preferably grouped into three category grades. Category grades are then combined into an overall print system grade. The grades may be assigned so as to follow usual academic curves or standards. The appreciation of the assigned grades may be assisted by presenting histograms of the grades achieved by similar print systems.

Figure 7:
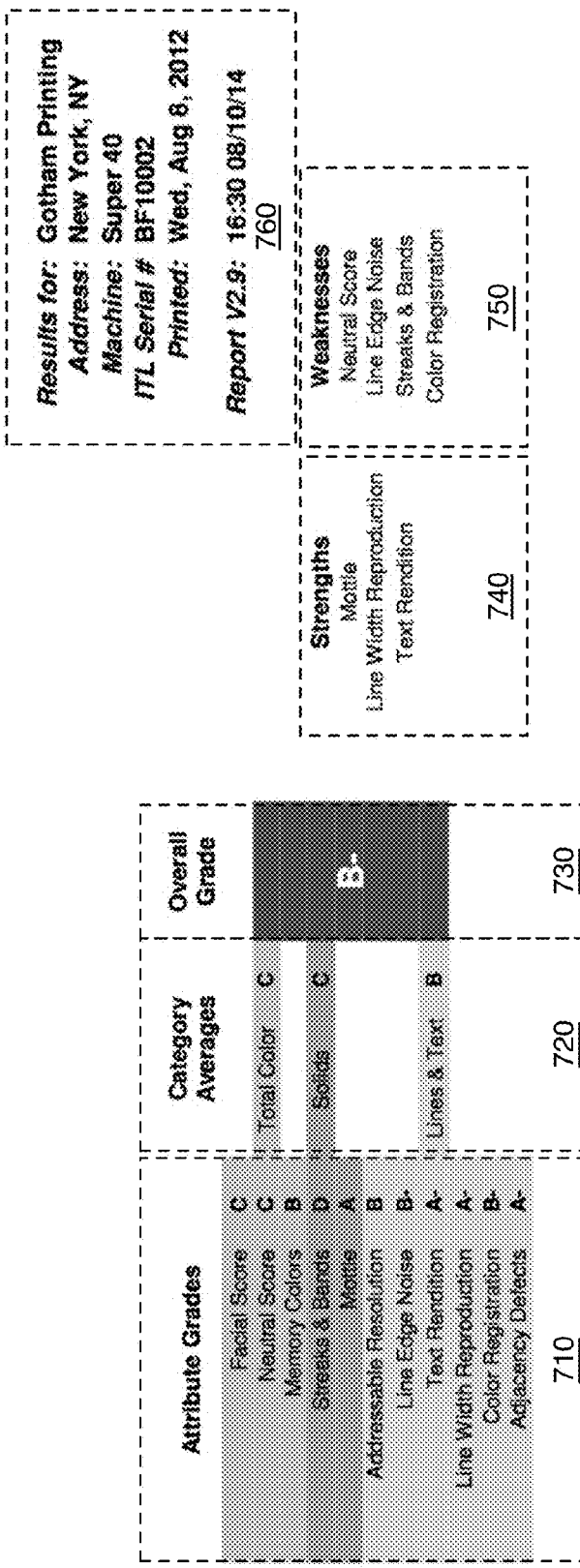

FIG. 7 is an example of a portion of a printing device evaluation report. Section 710 comprises individual attribute grades. In a preferred embodiment, eleven separate attributes are graded, including facial tone reproduction, neutral tone reproduction, memory color reproduction, streaks & bands, mottle, addressable resolution, line edge noise, text rendition, line width reproduction, color registration, and adjacency defects. Section 720 comprises averages for a plurality of attribute categories. In a preferred embodiment, the graded attributes are combined in categories related to color, solids, and lines & text. Section 730 comprises an overall grade for the evaluation. Section 740 lists strengths of the evaluated device. The strengths may be identified based on a grade threshold or relative to grades of a determined population of devices. Section 750 comprises a list of weaknesses of the evaluated printing device. As with strengths, the weaknesses may also be identified based on a grade threshold or a comparison to a population of printing devices. Section 760 comprises identifying information related to the printing device being evaluated and the evaluation itself, including machine location, model, serial number of the evaluation, print date, and report date.

The grading scale for each attribute is set to reflect the visual assessment of typical print customers. Setting of these scales involves industry standard measurements and expert visual assessment of images produced in a range of digital and analog printing systems and the development of a scoring system based on numerical measurements and standard reference images. Overall, category and attribute grades are built from combining the relevant category and attribute grades, as well as sub-attribute grades, where available. This combination weights the components according to their "importance" and "averages" them through a special algorithm that recognizes that poor performance in one attribute tends to lower customer satisfaction more than excellent performance in another attribute raises the customer satisfaction.

In computing a weighted average attribute grade from sub-attribute grades, the sub-attributes are assigned grades based on the same maximum grade, each grade multiplied by its importance factor (un-normalized), summed and then divided by the normalization factor (sum of the importance factors). In order for the method to adjust the attribute grade to emphasize the lower grades, the lower grades (20-40% of the total sub-attributes) are assigned greater weights (for example doubled or tripled) and the calculation redone. This adjusted grade will be only slightly reduced if the lower attributes are only slightly less than the initial weighted average, but will be pulled down significantly if the low grades are significantly below the weighted average. In this manner, the weighting of a particular sub-attribute grades starts with the basic customer value and then increases due to poor performance, correlating with customer perception.

The image attributes are grouped into three categories: Color, Solids and Line/Text. The Color Grade is built from pictorial grades on facial color, memory color and neutral balance, overall accuracy of RGB and Pantone colors and overall print color gamut achieved for prints from the PDF sources.

Accuracy grades are preferably based both on the magnitude and the statistical distribution of the errors, for example, average, median and 90th percentile accuracy. The grades for facial, neutral and memory color are "acceptability" of the rendering of these colors in a pictorial context. The Solids grade considers mottle, noise, and streaks and bands in the image. The Line/Text grade combines the system imaging performance in producing crisp edges, consistently following the PDF file's instructions for producing varying line widths, both for positive and negative lines, and producing pleasing and readable text at various point sizes and styles.

The Overall grade is a weighted combination of the three category grades, again using the non-linear approach starting with an importance weighting and then putting more weight on the lowest grades. The "importance weighting" is set for the overall graphics arts marketplace. Additional grade sets are available with the weights adjusted for specific markets, e.g. photo printing, transaction printing, packaging, etc. For instance, for printing systems focused on printing of photographs for consumers, skin tones may be given a higher weight. For systems focused on engineering drawings, line and small text rendering may be emphasized in the grading.

The evaluation system uses three levels of weighting: weights for building attribute grades from sub-attributes, weights for building category grades from attribute grades, and weights for building the overall grade from category grades. The primary set is built to reflect the customer preference for general graphics arts applications. However, many specific applications emphasize some attributes critically and almost ignore other attributes. For those applications, an overall grade may not be useful. To accommodate these situations, the evaluation system also preferably offers a series of market-specific weights and can deliver an alternate set of grades tailored for these applications. Two examples are: (1) photo printing (photo books, prints, other photo-driven products), which emphasizes uniformity (Solids) and the color attributes of facial, neutral, and memory colors with reduced emphasis on Pantone accuracy and text rendering and line width reproduction, and (2) package printing, which puts a premium on solids, color, and Pantone accuracy for brand identification and reduced emphasis on facial and neutral colors and text rendering.

In a preferred embodiment, all printer systems, independent of their technology, are graded to the same A-F standards, with a few exceptions. A notable exception is wide format printing, where the viewing distance is typically 60 inches, as opposed to other printing, which is generally viewed at 15-20 inches. In this case, accommodations are made in the evaluation, for instance, using larger text sizes, raising the noise cutoff frequency and shifting the frequency scale for line edge noise.

The evaluation system may use a central measurement facility 160 and personnel to assure consistency in scoring. For sensitive colors, the expected errors found in instruments in the field are significant compared to customer sensitivities for critical colors.

The evaluation system may be used by printers, photographic reproduction facilities, print buyers, and manufacturers of imaging devices, as well as for products produced thereon. Several use scenarios are anticipated:

(1) A subscription model, where a printer regularly, perhaps quarterly, tests one or more of his print systems, looking for consistency of quality, operator performance, hardware and software consistency, effectiveness of local and contracted maintenance, etc.

(2) A single use model used by printer purchasers to validate/compare imaging performance of one or more candidate products. This model is useful during the purchase of new or used equipment.

(3) A multi-site single-use-per-site model. This model is useful for a print buyer assessing the capability of several bidders for work, particularly if the vendors are geographically remote.

In cases 2 and 3, the evaluation system may send validated copies of the printer's report card to potential customers. The evaluation system may also be configured to receive queries regarding presses, for instance, a press that it offered for sale, and provide all or a subset of the evaluation report associated with that press, potentially in exchange for a fee.

Raw measurement data, attribute grades, category grades, and overall grades may be stored along with information about the press and factors related to production of the evaluation document and used for analysis and reporting. For instance, grades for multiple instances of the same press could be stored over time. The system could be used to produce reports showing the progression of grades for that type of press over time, providing an indication of the ability of that type of press to maintain its initial image quality as it ages.

As another example, all grades related to presses under service by a particular maintenance provider may be compared with corresponding presses or an average. The relative grades may be used as an indicator of the quality of the provider's maintenance services. Similarly, grades for particular presses using certain third-party supplies may be compared with those from presses using supplies from the manufacturer. The relative grades may be used as an indication of the impact of the third-party supplies on final product quality.

Grades for attributes related to particular tasks may be compared across types of printing systems or between different printing technologies. Furthermore, if environmental information is collected at the time of each evaluation, the impact of those environmental conditions on resulting grades may also be assessed using statistical analysis techniques. Comparisons may also be made between print facilities with common equipment. Trends in particular attributes for particular presses may be plotted over time both long term and relative to the time since particular types of service (e.g., noise vs. time since belt replacement).

FIG. 8 is an example of a portion of a printing device evaluation report. In this particular example, the report is a four-way comparison report. Report portion 800 comprises a table with a plurality of columns and rows containing evaluation information and results.

Column 805 of the report comprises names for the grade averages or individual grades. Column 810 comprises the grades for the printer under evaluation. Columns 820, 830, and 840 comprise grades for three printing systems against which the printer under evaluation is being compared. Columns 825, 835, and 845, comprise grade differences between the printer under evaluation and the respective comparison device.

Row 850 comprises the overall grades and overall grade differences for the printer under evaluation and the comparison printers. Rows 860 comprise the category average grades and category average grade differences for the printer under evaluation and the comparison printers. Rows 870 comprise the individual attribute grades and attribute grade differences for the printer under evaluation and the comparison printers.

The report 800 of FIG. 8 may be combined on the same page or with other pages of other report content. In the preferred embodiment, grades use a normal academic A-F grading scale with corresponding 4.0 numerical scale. It is to be understood that while this example compares a set of four printers, any number of printers may be compared within the scope of the invention.

Figure 9:
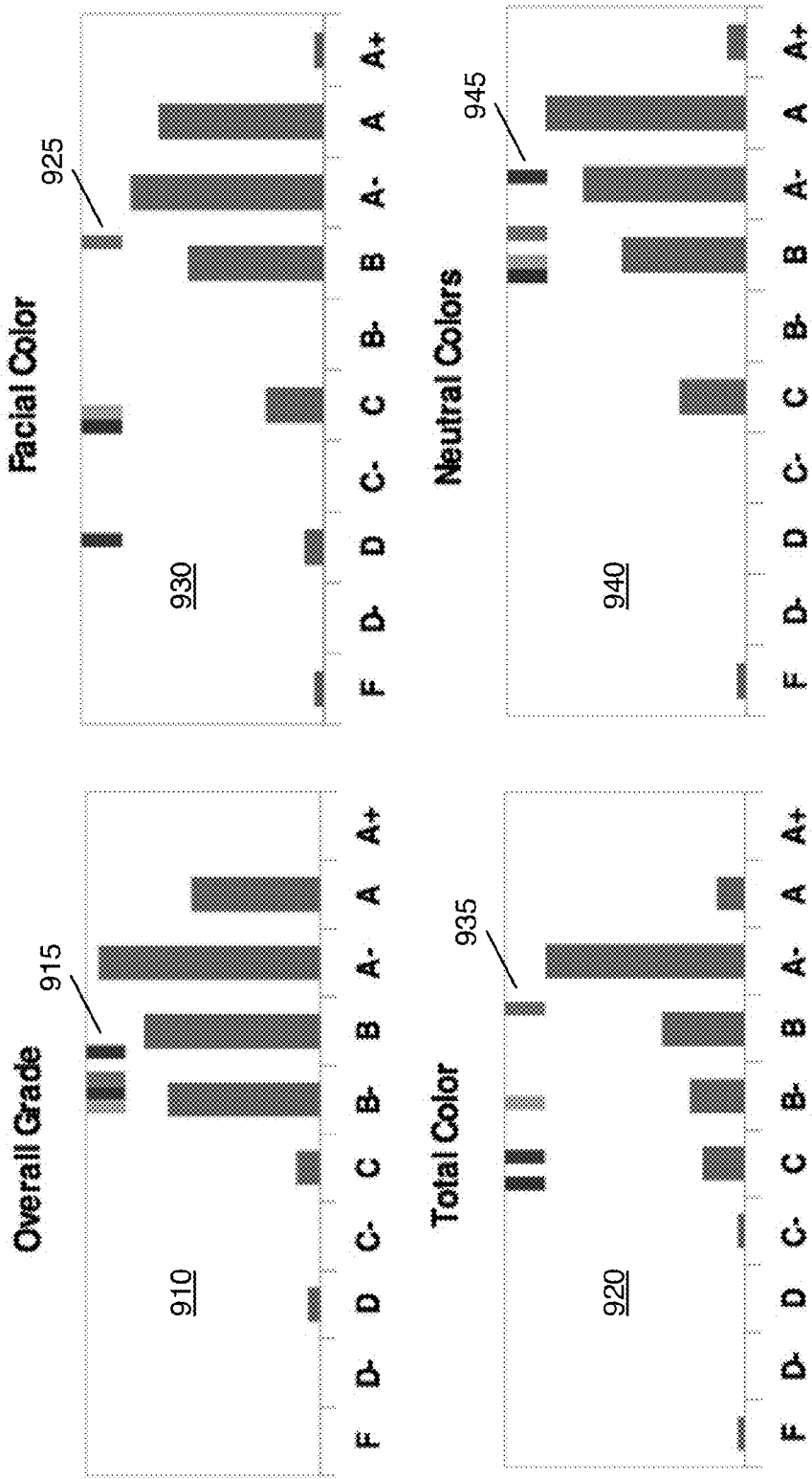

FIG. 9 is an example of another portion of a printing device evaluation report. In this example, the report is again a four-way comparison report.

Report portion 900 comprises four histograms 910-940. Each histogram 910-940 shows the distribution of grades for a population of printing devices, such as, for instance, all printing devices that have been tested, all printing devices that have been tested within a printing device class comprising the printing device being evaluated, or all printing devices of the particular model of printing device being evaluated. Thus, each histogram 910-940 provides an indication of the performance of the printing device relative to other devices. In a preferred embodiment, additional histograms are included, such as one for each row of the table of FIG. 8.

Additionally, each histogram may also be annotated with marks 915, 925, 935, 945 to indicate the performance of a specific set of printing devices being compared, such as the four printing devices under comparison in the table of FIG. 8. Each mark represents the grade for the associated printing device, such that the grade may be compared with the distribution of grades on the same scale represented in the histogram. For a report in which other specific devices are not being compared, only one mark of marks 915 may be present, representing the performance of the single printing device being evaluated.

In a preferred embodiment, the histograms 910-940, along with histograms for other attributes, are reproduced on a report page with the table of FIG. 8. In a preferred embodiment, multiple sets of histograms may be included in a report providing comparisons of the printing device being evaluated and specific comparison printing devices to different populations of printing devices. For instance, one page of a report may comprise histograms for the entire population of printing devices while a subsequent page may comprise histograms for all toner sheet-fed printing devices that have been evaluated.

The accumulated data from evaluations run on a variety of printing systems of varying technologies, along with associated collected meta data, may be used to develop new intelligence on how printers and print products perform in the field, or to understand and predict or improve performance, etc. Thus, the database may be used to understand how printing systems and printers are performing rather than just being used to provide a new set of test results to a customer.

It is to be recognized that the types of reporting that may be performed are not limited to the examples provided. Instead, the system may provide the capability of user selection of filters for press selection and attributes or grades to be evaluated. Printing system, grade, evaluation document, and weighting data may be stored in one or more local or Internet databases. Web interfaces may be provided both for customer and evaluator access to data. Measurement may be performed remotely and resulting data transferred over a network to a database.

We claim:

1. A method of evaluating a printing system comprising:
receiving a printed image evaluation document produced by the printing system;
measuring attributes of first test patterns of the printed image evaluation document using at least one of a colorimeter, a spectrophotometer, and a densitomer;
performing visual assessment of attributes of second test patterns of the printed image evaluation document;
assigning first attribute grades to the attributes associated with the measured attributes;
assigning second attribute grades to the attributes associated with the visual assessment;
grouping the first attribute grades and the second attribute grades into categories;
computing a grade for each category based upon the first attribute grades and second attribute grades grouped in that category; and
computing an overall grade based upon the category grades.

2. The method of claim 1 wherein the attributes of first test patterns and the attributes of second test patterns comprise at least three of: facial reproduction, neutral reproduction, memory color reproduction, streaking and banding, mottle, resolution, line edge noise, text rendition, line width reproduction, color registration, and adjacency defects.

3. The method of claim 1 wherein the categories comprise categories associated with attributes associated with color, solids, and lines & text.

4. The method of claim 1, further comprising:
generating a report with the attribute, category, and overall grades; and
transmitting the report.

5. The method of claim 1, further comprising:
generating an electronic image evaluation document; and
transmitting the electronic image evaluation document to a printing facility at which the printing system resides.

6. The method of claim 1, wherein the image evaluation document comprises at least two of:
a three-color grayscale step chart;
a single-color grayscale step chart;
a four-color grayscale step chart;
at least one of a single-color cyan, magenta, or yellow step chart;
a pictorial comprising an image of a human face;
a pictorial comprising objects with memory colors;
an array of color patches;
lines at right angles;
horizontal lines of varying width;
vertical lines of varying width;
text on color backgrounds;
lines of different colors abutted end-to-end; and
concentric circles.

7. The method of claim 6, wherein the color patches comprise color patches related to input values spaced approximately uniformly through the input color space.

8. The method of claim 1 wherein the image evaluation document comprises:
a set of substantially identical pages; and
a set of unique pages.

9. The method of claim 8, wherein each page in the sequence of substantially identical pages differs in identifying information.

10. The method of claim 1 wherein the image evaluation document is generated based upon information related to the capabilities of a target imaging device.

11. A method of evaluating imaging devices comprising:
evaluating, using at least one of a colorimeter, a spectrophotometer, and a densitomer, attributes of a first copy of an image evaluation document printed using a first instance of a type of imaging device to produce a first set of grades;
evaluating, using at least one of a colorimeter, a spectrophotometer, and a densitomer, attributes of a second copy of an image evaluation document printed using a second instance of a type of imaging device to produce a second set of grades;
comparing the first and second grades to one or more predetermined grade-difference thresholds;
responsive to a determination that a difference between the first set of grades and the second set of grades exceeds a threshold, determining a difference in at least one of maintenance, materials, or operating procedure between the printing of the image evaluation document on the first instance of a type of imaging device and the second instance of a type of imaging device;

resolving the determined difference in at least one of maintenance, materials, or operating procedure; and evaluating, using at least one of a colorimeter, a spectrophotometer, and a densitomer, attributes of a third copy of an image evaluation document printed on the first instance of a type of imaging device to produce a third set of grades.

12. The method of claim 11 wherein evaluating a copy of an image evaluation document comprises:

receiving a printed image evaluation document;

measuring attributes of first test patterns of the printed image evaluation document;

performing visual assessment of attributes of second test patterns of the printed image evaluation document;

assigning first attribute grades to the attributes associated with the measured attributes;

assigning second attribute grades to the attributes associated with the visual assessment;

grouping the first attribute grades and the second attribute grades into categories;

computing a grade for each category based upon the first attribute grades and second attribute grades grouped in that category; and computing an overall grade based upon the category grades.

13. The method of claim 11 wherein the first grades and the second grades comprise grades for at least three of: facial reproduction, neutral reproduction, memory color reproduction, streaking and banding, mottle, resolution, line edge noise, text rendition, line width reproduction, color registration, and adjacency defects.

14. The method of claim 11 wherein the grades are combined into categories associated with color, solids, and lines & text.

15. The method of claim 11 wherein evaluating the printed image evaluation document:

further uses visual scoring.

16. The method of claim 15 wherein the visual scoring comprises:

comparing a portion of the printed image evaluation document to a set of reference samples corresponding to the portion of the printed image evaluation document.

17. A method of evaluating imaging devices comprising:

evaluating, using at least one of a colorimeter, a spectrophotometer, and a densitomer, attributes of a plurality of copies of an image evaluation document printed using a plurality of first imaging devices to produce a plurality of first sets of grades;

evaluating, using at least one of a colorimeter, a spectrophotometer, and a densitomer, attributes of a copy of an image evaluation document printed using a second imaging device to produce a second set of grades; and generating a report comprising a plurality of histograms representing the distribution of grades for each of a plurality of attributes of the plurality of first sets of grades, wherein each of said histograms is marked with an indication of the corresponding attribute grade from the second set of grades.

18. The method of claim 17 wherein the first sets of grades and the second set of grades comprise grades for at least three of: facial reproduction, neutral reproduction, memory color reproduction, streaking and banding, mottle, resolution, line edge noise, text rendition, line width reproduction, color registration, and adjacency defects.

19. The method of claim 17 wherein evaluating a copy of an image evaluation document comprises:

receiving a printed image evaluation document;

measuring attributes of first test patterns of the printed image evaluation document;

performing visual assessment of attributes of second test patterns of the printed image evaluation document;

assigning first attribute grades to the attributes associated with the measured attributes;

assigning second attribute grades to the attributes associated with the visual assessment;

grouping the first attribute grades and the second attribute grades into categories;

computing a grade for each category based upon the first attribute grades and second attribute grades grouped in that category; and computing an overall grade based upon the category grades.

* * * * *